(12) United States Patent
Solitt

(10) Patent No.: US 6,735,022 B1
(45) Date of Patent: May 11, 2004

(54) VIEWING AND INSPECTION BOX

(76) Inventor: Samuel G. Solitt, 2121 Brookshire, Akron, OH (US) 44313

( * ) Notice: Subject to any disclaimer, the term of this patent is extended or adjusted under 35 U.S.C. 154(b) by 0 days.

(21) Appl. No.: 10/143,715

(22) Filed: May 13, 2002

(51) Int. Cl.$^7$ .......................... G02B 27/02; B65D 6/04; A47F 11/10
(52) U.S. Cl. ...................... 359/802; 359/804; 206/566; 362/125
(58) Field of Search ................................ 359/800–802, 359/804, 805, 808–810, 894, 614; 206/476, 486, 487, 566, 736; 362/125

(56) References Cited

U.S. PATENT DOCUMENTS

| | | | | |
|---|---|---|---|---|
| 3,232,302 A | * | 2/1966 | Methot | 453/44 |
| 3,936,156 A | * | 2/1976 | Shaw et al. | 359/802 |
| 4,720,184 A | * | 1/1988 | Watson | 359/856 |
| 6,494,316 B1 | * | 12/2002 | Bloch et al. | 206/45.2 |

* cited by examiner

*Primary Examiner*—Georgia Epps
*Assistant Examiner*—William Choi
(74) *Attorney, Agent, or Firm*—Renner, Kenner, Greive, Bobak, Taylor & Weber

(57) ABSTRACT

In general, the present invention provides a viewing and inspection box having a base, a top wall, opposing side walls, and a rear wall defining an interior that is viewed through an open front of the box. An inspection light is held in proximity to the top wall and illuminates the interior of the box. An inspection apparatus, such as a magnifying glass, extends from one of the walls to extend beneath the inspection light. A display panel is maintained between the base and the rear wall at an angle relative to the base, and is further maintained below the inspection apparatus such that the inspection apparatus is positioned between the inspection light and the display panel.

14 Claims, 3 Drawing Sheets

VIEWING AND INSPECTION BOX

FIELD OF THE INVENTION

This invention relates in general to a portable apparatus for enhancing the viewing of small objects by magnification and relates, in particular, to such a device for use in connection with the sale of jewelry or other, similar small objects.

DESCRIPTION OF THE PRIOR ART

Conventionally, jewelry or other small objects are displayed in various ways in retail stores. The object of a display is to enhance the appearance of the object and to permit potential purchasers to view the object to its best advantage, and in considerable detail, in an environment that optimally enhances the likelihood of a sale.

A number of various ways of displaying objects of this type are known in the art. Conventionally, when displaying a finger ring, for example, the ring would be disposed in a box, which may or may not have a closeable lid, with the ring itself being supported by a soft pad of felt or some similar material to provide a background for enhancing the appearance of the ring or other article being viewed. The box is then normally placed in a display case or window in a jewelry store and can be viewed from a distance by the potential purchaser through the glass of the case or window.

A closer inspection can be provided by removing the box from the display case or window and allowing the potential purchaser to view the contents at a closer range. It is also possible to provide a magnifying glass to enable the potential purchaser to view the fine points of the article.

However, it is believed desirable to incorporate all of these features into one device which can be repetitively used and which permits the potential purchaser to view the article in various modes including a magnified mode.

SUMMARY OF THE INVENTION

In general, the present invention provides a viewing and inspection box having a base, a top wall, opposing side walls, and a rear wall defining an interior that is viewed through an open front of the box. An inspection light is held in proximity to the top wall and illuminates the interior of the box. An inspection apparatus, such as a magnifying glass, extends from one of the walls to extend beneath the inspection light. A display panel is disposed between the base and the rear wall at an angle relative to the base, and is further disposed below the inspection apparatus such that the inspection apparatus is positioned between the inspection light and the display panel.

The viewing and inspection box of this invention may be used to view objects by magnification and illumination. An object to be viewed, such as a ring, is placed on the display panel, and the inspection light is activated to illuminate the object. The object is then viewed through the inspection apparatus that is maintained between the inspection light and the object placed on the display panel. It is appreciated that the inspection apparatus will typically be a magnifying glass, although other means for inspecting objects, may be employed without departing from the scope of this invention. In preferred embodiments, the inspection apparatus is adjustable so as to provide different viewing angles with respect to the object being viewed. Additionally, it is preferred that the display panel within the viewing and inspection box may be selected so as to rest at desired angles relative to the base of the inspection box.

Thus, a particular embodiment of this invention provides a modifiable viewing and inspection box assembly including a box having a base, a top wall, opposed side walls, and a rear wall defining an interior that is viewed through an open front of the box, and the base of the box has a notch therein. An inspection light is held in proximity to the top wall and illuminates the interior of the box. An inspection apparatus extends from one of the walls to extend beneath the inspection light. A plurality of display panels are provided, each display panel being adapted to be capable of being partially received in the notch in the base of the box to extend at an angle between the notch and the rear wall of the box such that a given one of the plurality of display panels can be positioned at an angle with respect to the base.

As with the more general embodiment first summarized above, the inspection apparatus of this embodiment is preferably a magnifying glass, although not limited thereto or thereby. It is additionally preferred that such magnifying glass be adjustable. To aid in focusing attention on the item being displayed in the viewing box, the walls of the inspection box, in either embodiment, may be covered with a light absorbing material, for example, black felt. The display panel or panels may include slots or supports for securing items placed thereon.

Accordingly, production of a viewing and inspection box of the character above described becomes the principal object of this invention with other objects thereof becoming more apparent upon reading the following brief description considered and interpreted in view of the accompanying drawings.

BRIEF DESCRIPTION OF THE PREFERRED EMBODIMENTS

Figure 1:
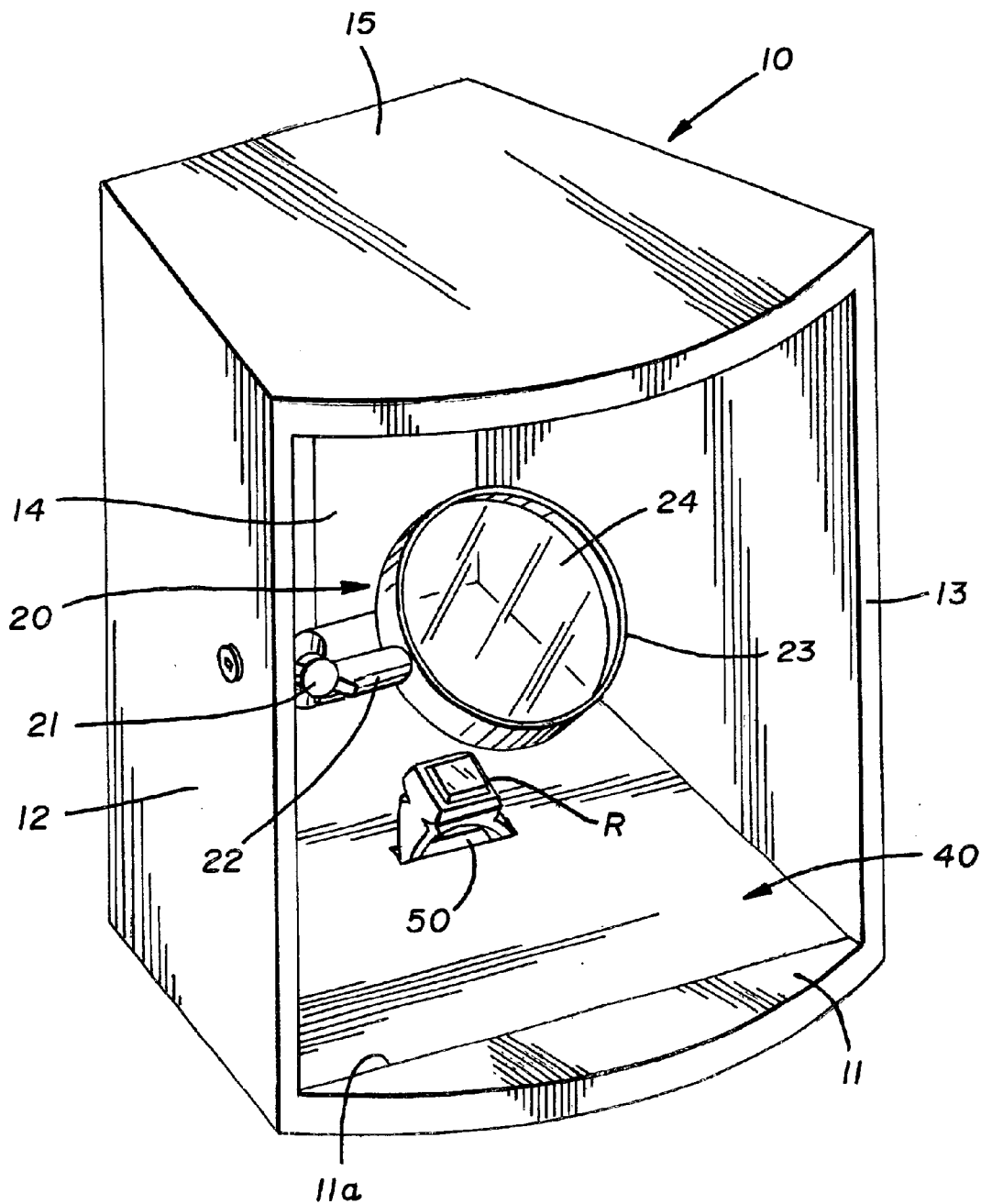
FIG. 1 is a perspective view of the viewing box of this invention.

Referring first to FIG. 1 of the drawings, it will be noted that the improved apparatus is generally indicated by the numeral 10 and includes a base 11 and opposed side walls 12 and 13 which extend upwardly from the perimeter of base 11. Although not required, the side walls extend inwardly such that the inspection box 10 has wedge-shaped top and bottom planar profiles. A rear wall 14 also extends upwardly and joins the inward edges of side walls 12 and 13. A top wall 15 is also provided and this wall is disposed at the top edges of side walls 12 and 13 and rear wall 14 so as to form an open-faced enclosure enclosed on three sides about its periphery and with base 11 and top wall 15 being disposed in opposed relationship.

Magnifying glass 20 is also provided. Magnifying glass 20 projects inwardly from one of side walls 12, 13. In the illustrations, the magnifying glass 20 projects inwardly from side wall 12, but it could obviously also project inwardly from opposed side wall 13. The magnifying glass is screwed or otherwise secured to side wall 12 and is provided with thumbscrew 21 which, in known fashion, controls the axial position of magnifying glass 20 through the stem or arm 22. Frame 23 of magnifying glass 20 includes lens 24 in known fashion. As can be seen from FIG. 3, magnifying glass 20 can be tilted as shown by the full and broken line positions P1 and P2, although it should be appreciated that any number of positions are possible, as magnifying glass 20 is pivotal at arm 22.

Although magnifying glass 20 is the preferred inspection means for use in the present invention, the invention is not to be limited thereto or thereby and other inspection means may be employed. Indeed, any suitable inspection apparatus may be employed in place of magnifying glass 20.

Light source 30 is carried on the underneath surface of top wall 15 and is connected to a power source by means of connecting cord 31 leading to a transformer 60 and plug 70. Of course alternative power sources, for example, batteries could also be employed. It will be seen from FIGS. 2 and 3 that light source 30 is disposed on top wall 15 so as to overlay both magnifying glass 20 and the top of base 11.

Base 11 has a transverse notch or groove 11a adjacent its front edge for receipt of display panel 40. Display panel 40, as can be seen in FIGS. 1 through 4, is an elongate board or panel having opposed ends 42, 44. When fit into inspection box 10, end 42 is received in notch 11a within base 11, with opposed end 44 resting against connecting cord 31, which runs down the interior surface of rear wall 14. Of course, connecting cord 31 may be configured to run down along the outside of rear wall 14, such that display panel 40 could rest against the interior surface of rear wall 14. Alternatively, wall 14 could be hollow or have a through channel for receipt of connecting cord 31. It will be noted that this enables display panel 40 to be disposed, for enhanced viewing purposes, at an angle with respect to the plane of base 11.

Figure 3:
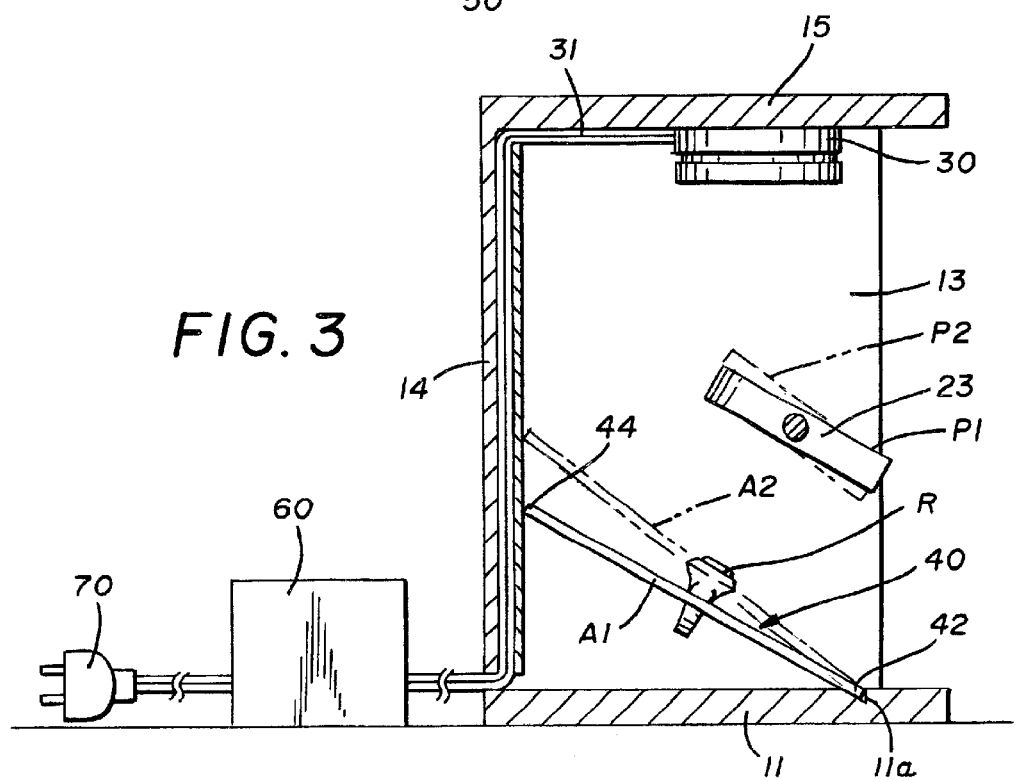
FIG. 3 is a sectional view taken along the line 3—3 of FIG. 2, although features have been added in phantom to aid in disclosing the invention
Figure 4:
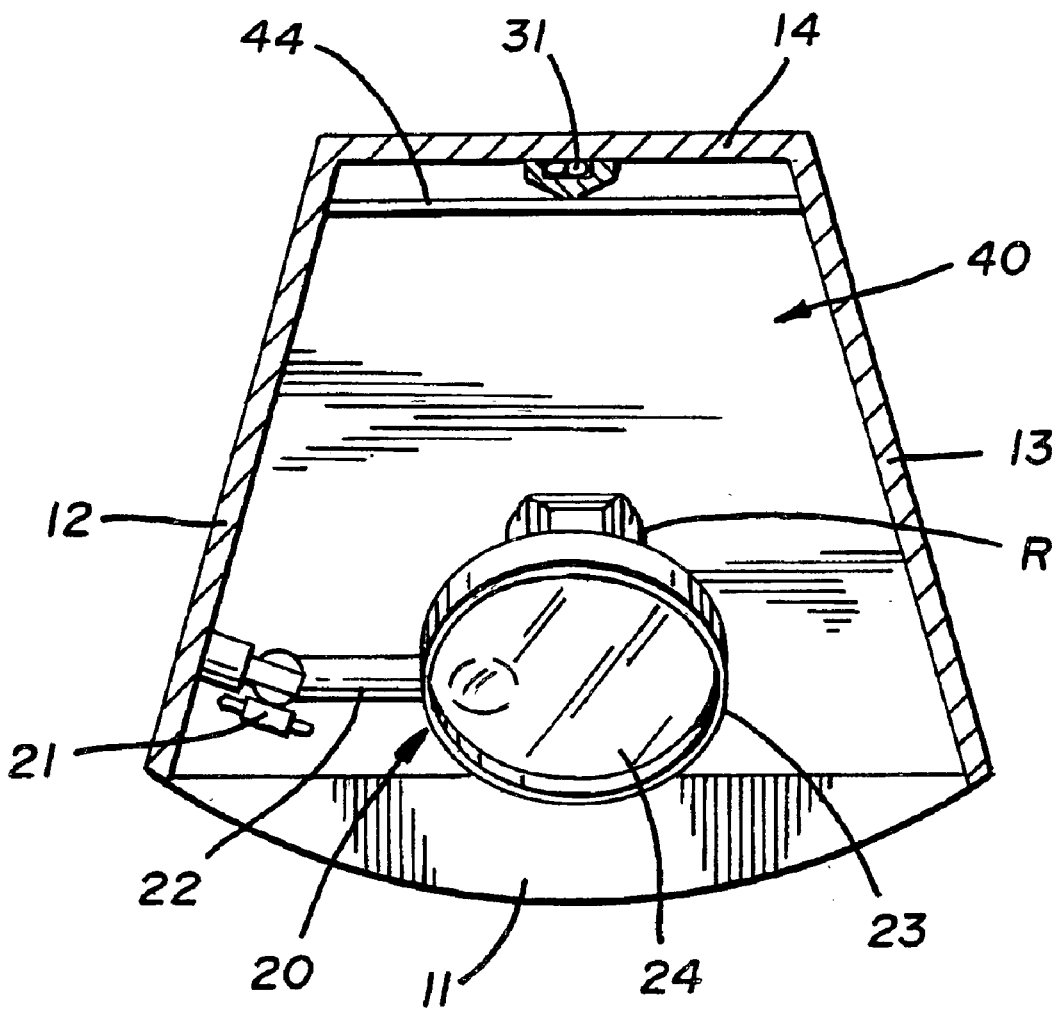
FIG. 4 is a sectional view taken along the line 4—4 of FIG. 2.

As can be seen from designations A1 and A2 in FIG. 3, display panel 40 is simply set into the groove 11a or removed therefrom without the need of any tools or adjustment apparatus. The angle with which the article is displayed, relative to the plane of the base, can be altered by providing different lengths of display panels 40 as shown by the fill (A1) and broken (A2) line depictions of display panel 40.

Realizing that it may be desirable to have an inspection box capable of displaying items at many different angles, it is contemplated that the present invention could be adapted to provide a modifiable viewing and inspection box assembly wherein a plurality of different sized display panels are provided to compliment the other elements of the inspection box. Particularly, as should be appreciated from FIG. 3, multiple display panels of different dimensions would provide different resting angles when maintained between notch 11a and connecting cord 31 or rear wall 14, as described above.

Figure 2:
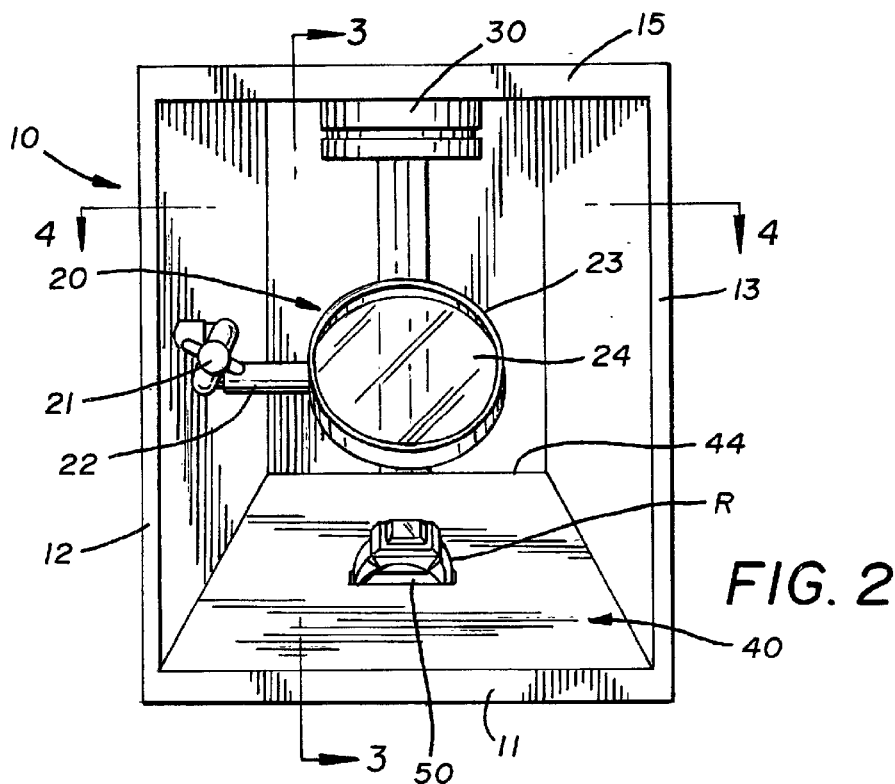
FIG. 2 is a front elevational view thereof.

Preferably, display panel 40 provides a support for the article that is to be viewed in viewing and inspection box 10. In FIG. 2, a ring R is shown as supported in a slot 50 that is provided in display panel 40, below light source 30. However, slot 50 is only an exemplary type of support, and other types of supports might be employed, with a given support being chosen according to a preferred manner for displaying a given article.

It will be understood also that display panel 40 would receive a covering which preferably would be a dark or matte surface to set off the article, such as a diamond or a ring, etc., which would be positioned either on it or within it, for example, by being secured in support 50 in display panel 40. It is also contemplated that the interior surfaces of the walls, such as the side walls, rear wall, top wall and even the base, could be either covered or painted with an identical or similar dark color so as to further enhance the viewing properties of the apparatus. To focus attention on the articles being viewed in inspection box 10, the interior of inspection box 10 is preferably covered in light absorbing material, such as dark colored paints or felts.

It will be seen that it is a simple matter to adjust the angle at which the article is viewed and in practice it would normally be the case where the article would be displayed in the display case or display window in the conventional box such as a ring box, watch box, bracelet box, etc. and when further and closer inspection is desired, it can be removed therefrom and placed either on or in display panel 40 with the display panel then being inserted into inspection box 10 and, upon activation of light source 30 and proper adjustment of magnifying glass 20, close inspection can be achieved.

While a fill and complete description of the invention has been set forth in accordance with the dictates of the Patent Statutes, it should be understood that modifications can be resorted to without departing from the spirit hereof or the scope of the appended claims.

For example, while two display panels are contemplated and illustrated in the drawings, the apparatus would be equally effective utilizing only one or perhaps providing more than two so as to provide a greater variety of angles for the display panel once it is inserted into the apparatus 10.

Also, while the invention has basically been described and illustrated in conjunction with the inspection of an article of jewelry, other small articles would obviously be capable of being displayed and inspected in this device.

What is claimed is:

1. A viewing and inspection box comprising:
    a box having a base, a top wall, opposed side walls, and a rear wall defining an interior that is viewed through an open front of said box;
    an inspection light held in proximity to said top wall and illuminating said interior of said box;
    an inspection apparatus extending from one of said walls to extend beneath said inspection light; and
    a display panel maintained between said base and said rear wall at an inclined angle relative to said base, said display panel further maintained below said inspection apparatus such that said inspection apparatus is positioned between said inspection light and said display panel.

2. The viewing and inspection box of claim 1, wherein said inspection apparatus is a magnifying glass.

3. The viewing and inspection box of claim 2, wherein said magnifying glass is adjustable in its length of extension from the one of said walls from which it extends.

4. The viewing and inspection box of claim 3, wherein the magnifying glass includes a lens that is adjustable to different angles relative to said inspection light.

5. The viewing and inspection box of claim 1, wherein the display panel includes a support for retaining items to be viewed within the inspection box.

6. The viewing and inspection box of claim 1, wherein the interior faces of said walls and said display panel are covered in light absorbing material.

7. The viewing and inspection box of claim 6, wherein the interior faces of said walls and said display panel are covered with black felt.

8. A modifiable viewing and inspection box assembly comprising:
    a box having a base, a top wall, opposed side walls, and a rear wall defining an interior that is viewed through an open front of said box, said base having a notch therein;

a inspection light held in proximity to said top wall and illuminating said interior of said box;

an inspection apparatus extending from one of said walls to extend beneath said inspection light; and a plurality of display panels, each display panel of said plurality of display panels having a different length, and adapted to be capable of being partially received in said notch to extend at a different inclinded angle between said notch and said rear wall such that a selected display panel can be positioned at a complimentary angle with respect to said base.

9. The viewing and inspection box of claim 8, wherein said inspection apparatus is a magnifying glass.

10. The viewing and inspection box of claim 9, wherein said magnifying glass is adjustable in its length of extension from the one of said walls from which it extends.

11. The viewing and inspection box of claim 10, wherein the magnifying glass includes a lens that is adjustable to different angles relative to said inspection light.

12. The viewing and inspection box of claim 8, wherein said selected display panel includes a slot for retaining items to be viewed within the inspection box.

13. The viewing and inspection box of claim 8, wherein the interior faces of said walls and said selected display panel are covered in light absorbing material.

14. The viewing and inspection box of claim 13, wherein the interior faces of said walls and said selected display panel are covered with black felt.

* * * * *